United States Patent

Hakogi et al.

[11] Patent Number: 5,612,086
[45] Date of Patent: Mar. 18, 1997

[54] METHOD OF MANUFACTURING AN OPTICAL WAVEGUIDE DEVICE

[75] Inventors: Hironao Hakogi; Takashi Yamane; Junko Watanabe, all of Kawasaki, Japan

[73] Assignee: Fujitsu Limited, Kanagawa, Japan

[21] Appl. No.: 256,179

[22] PCT Filed: Oct. 28, 1993

[86] PCT No.: PCT/JP93/01565

§ 371 Date: Jun. 28, 1994

§ 102(e) Date: Jun. 28, 1994

[87] PCT Pub. No.: WO94/10592

PCT Pub. Date: May 11, 1994

[30] Foreign Application Priority Data

Oct. 28, 1992 [JP] Japan .................................. 4-290020

[51] Int. Cl.⁶ .................................................. B05D 5/06
[52] U.S. Cl. ...................... 427/163.2; 427/287; 427/289; 427/376.7; 427/399
[58] Field of Search ................... 427/163.2, 289, 427/287, 399, 376.7

[56] References Cited

U.S. PATENT DOCUMENTS

| | | | |
|---|---|---|---|
| 3,997,687 | 12/1976 | Phillips | 427/163.2 |
| 4,037,005 | 7/1977 | Phillips | 427/163.2 |
| 4,056,304 | 11/1977 | Phillips | 427/163.2 |
| 4,100,313 | 7/1978 | Hammer et al. | 427/163.2 |
| 4,284,663 | 8/1981 | Carruthers et al. | 427/163.2 |
| 4,300,814 | 11/1981 | Carenco | 427/163.2 |
| 4,376,138 | 3/1983 | Alferness et al. | 427/163.2 |
| 4,382,978 | 5/1983 | Chen | 427/163.2 |

FOREIGN PATENT DOCUMENTS

| | | |
|---|---|---|
| 58-66916 | 4/1983 | Japan . |
| 27019 | 1/1990 | Japan . |
| 43128 | 1/1992 | Japan . |

*Primary Examiner*—Janyce Bell

[57] ABSTRACT

Electric discharge breakdown in an optical waveguide pattern formed on a crystal substrate having pyroelectric effect is substantially extinguished or reduced, so that the yield of optical waveguide devices in the manufacturing process can be increased. A plurality of optical waveguide patterns 5 are formed, in parallel, by means of heat treatment on a substrate 2 of lithium niobate having pyroelectric effect, and the formed waveguide patterns are cut into a predetermined chip-shape. In the manufacturing method of this optical waveguide device, patterns are formed so that both ends of the optical waveguide pattern 5 are respectively communicated at a position where both ends of the optical waveguide pattern 5 are out of an effective chip range. Further, a dummy pattern 26 is formed at a position close to a waveguide pattern 25.

15 Claims, 8 Drawing Sheets

1

METHOD OF MANUFACTURING AN OPTICAL WAVEGUIDE DEVICE

TECHNICAL FIELD

The present invention relates to a manufacturing method for an optical waveguide device formed on a substrate having a pyroelectric effect.

BACKGROUND ART

Recently, in the field of information processing and transmission, attention has been given to an information processing system in which an optical communication system is used for increasing the amount of information transmitted and extending the functions of the system. Accordingly, there is a great demand for optical control devices such as optical switches and optical modulators to control optical signals. Further, there is a demand for optical control devices in which processing is carried out at high speed, the efficiency is high, the dimensions are reduced, and parts are integrated.

As examples of optical control devices used for optical communication which satisfy the demands described above, optical modulators and optical switches are known in which optical waveguide patterns are formed on a crystal substrate, and electrodes and others are arranged on these patterns. Especially, in order to enhance the efficiency and speed, attention is given to a substrate in which a crystal of lithium niobate (LiNbO$_3$) or lithium tantalate (LiTaO$_3$) is used because the crystal is a ferroelectric substance provided with electro-optical effect.

In the case of the optical waveguide device in which a crystal of LiNbO$_3$ or LiTaO$_3$ is used as the substrate, a pattern of the optical waveguide is formed in the following manner:
An optical waveguide pattern is formed on a substrate, using a metal such as titanium (Ti), by means of photolithography. When the substrate and pattern are heated to a temperature of 1000° C. to 1050° C., Ti metal on the substrate is thermally diffused, so that an optical waveguide pattern is formed, the width of which is usually several μm to several tens of μm, and the length of which is several mm to several tens of mm.

Since the above substrate, made of LiNbO$_3$ or LiTaO$_3$, exhibits a strong pyroelectric effect, an electric charge is generated when the temperature is changed, so that the substrate surface is electrically charged and a high potential is generated on the surface. Accordingly, a large amount of pyroelectric charge tends to accumulate on the metallic pattern (optical waveguide pattern) when the metallic pattern of Ti is heated so as to be diffused onto the substrate surface. As a result, an electric discharge is caused in a portion on the substrate, and the optical wavelength pattern is damaged.

When the rate of increase of the temperature is reduced to provide a gentle temperature change in the case where the substrate is heated, serious problems are not caused. However, in the case where the substrate is heated to a temperature from 1000° C. to 1050° C., taking into consideration that the productivity is enhanced, the substrate is heated, for example, at a rate of 10° C./min. In this case, there is a possibility that an electric discharge is caused between the waveguide patterns by the pyroelectric effect.

In this connection, the following method can be considered. The temperature of the substrate is not quickly increased, and any generated electric charge is neutralized by ions included in the atmosphere. In this way, an excessive amount of electric charge is not accumulated on the waveguide pattern. However, this method is disadvantageous in that a complicated ion supply device is required. Therefore, this method can not be put into practical use.

DISCLOSURE OF THE INVENTION

It is an object of the present invention to provide a manufacturing method for an optical waveguide device by which an electric discharge breakdown of the optical waveguide can be effectively prevented in the heat treatment process.

In order to accomplish the above object, the present invention is to provide a manufacturing method of an optical waveguide device comprising the steps of: forming a metallic conductor pattern on a substrate exhibiting a pyroelectric effect; heating the substrate to thermally diffuse the conductor pattern so as to form an optical waveguide pattern; and cutting the substrate at the "effective chip range" so as to provide a chip-shaped optical waveguide device. According to an embodiment of the present invention, a conductor portion wider than the optical waveguide pattern is formed at a position out of the "effective chip range" on the substrate, and at least one end of the conductor pattern for the optical waveguide pattern communicates with the conductor portion.

Due to the foregoing construction, at the position out of the "effective chip range", the end of the optical wavelength pattern communicates with the conductor portion, the area of which is relatively wide. Accordingly, an electric charge flows to the conductor portion, so that an electric discharge breakdown of the optical waveguide pattern can be prevented or reduced.

According to another embodiment of the present invention, the present invention provides a manufacturing method for an optical waveguide pattern characterized in that: at a position on the substrate out of the "effective chip range", a connecting conductor portion communicated with the end of each optical waveguide pattern, and an electric discharge inducing portion protruding from the connecting conductor portion, are formed simultaneously with the formation of the waveguide pattern.

Due to the foregoing, an electric discharge is positively caused by the electric discharge inducing pattern disposed out of the "effective chip range" so that the accumulated electric charge can be discharged. Therefore, an amount of electric charge at the optical waveguide pattern side is substantially reduced, so that an electric discharge breakdown of the optical waveguide pattern can be prevented or reduced.

According to still another embodiment of the present invention, the present invention is to provide a manufacturing method of an optical waveguide pattern characterized in that: a dummy pattern which is a conductor pattern shorter than the conductor pattern for the optical waveguide is formed at a position on the substrate close to the optical waveguide pattern simultaneously with the formation of the optical waveguide pattern.

Due to the foregoing, the electric charge is dispersed all over the substrate by the dummy pattern disposed close to the optical waveguide pattern. Accordingly, it is difficult for the optical waveguide pattern to be damaged by the electric discharge of the optical waveguide pattern.

BEST MODE FOR CARRYING OUT THE INVENTION

With reference to the accompanying drawings, a plurality of embodiments will be explained as follows. In this case, an explanation common among the embodiments is made in a passage where it appears for the first time, and the explanation will be omitted later.

Figure 1:
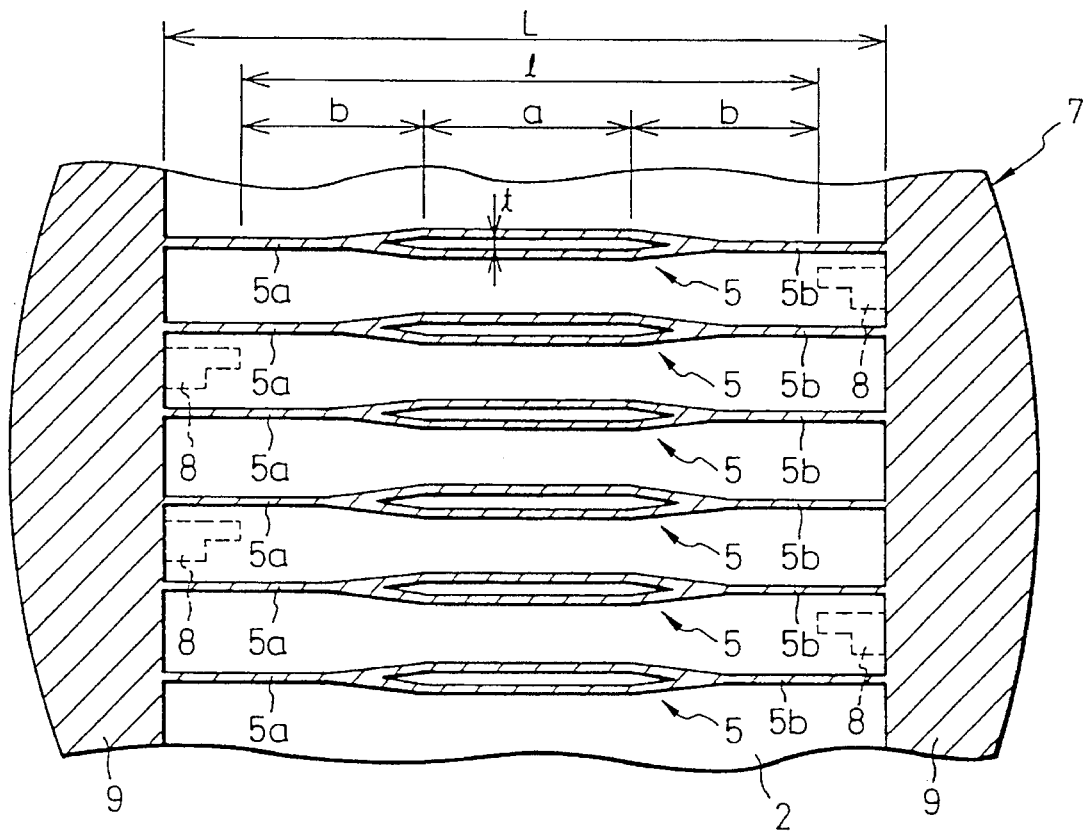
FIG. 1 is a plan view of the primary portion of the wafer on which is formed an optical waveguide pattern of the first embodiment of the manufacturing method of the optical waveguide device of the present invention.

First, FIG. 1 is a partial plan view of the wafer 7 in which a plurality of optical waveguide patterns 5 are regularly disposed on the substrate 2 made of crystals of lithium niobate ($LiNbO_3$) or lithium tantalate ($LiTaO_3$).

A diameter of the wafer 7 is approximately 75 mm. As is well known, in order to appropriately position the wafer 7, a part of the periphery of the wafer 7 is linear, and the remaining part thereof is approximately circular. Usually, thirty two optical waveguide patterns 5 disposed in parallel are provided on one wafer 7 (substrate 2).

The optical waveguide patterns 5 are formed in the following manner:
A metallic film of Ti which has already been formed into a pattern is deposited on the substrate 2 by means of a well-known method such as regist. Then the substrate is heated to a temperature of about 1000° to 1050° C., so that the metallic film is dispersed from the surface of the substrate 2 to the inside by the heat treatment. In this way, a high refraction portion (metallic pattern) is formed at a position close to the surface of the substrate 2.

As can be clearly seen from FIG. 1, the configuration of each optical waveguide pattern 5 formed on the substrate 2 includes: a central portion composed of two parallel portions, the length "a" of which is several mm to several tens mm; and portions disposed on both sides where one portion is divided into 2, or two portions are joined into one, the length "b" of which is several mm to 10 mm, wherein the total length "l" of length "a" and length "b" disposed on both sides is defined as the "effective chip range". An interval "t" of the two central portions which are parallel to each other is several mm to several tens mm.

Finally, the wafer 7 is cut with a dicing saw at the "effective chip range" l, and further the wafer 7 is cut into each chip of the optical waveguide patterns usually disposed in parallel.

As described above, the substrate 2 composed of crystals of $LiNbO_3$ or $LiTaO_3$ has an pyroelectric effect. Accordingly, concerning the substrate 2 composed in the manner described above, there is an extremely high possibility that electric discharge breakdown is caused between the metallic patterns or between the metallic pattern and charged particles in the atmosphere.

However, in each embodiment of the present invention, the following characteristic method is employed so that the above problems are excellently solved.

Explanations will be made with respect to the first embodiment shown in FIG. 1. Both ends 5a and 5b (for example, the input portion 5a on the left, and the output portion 5b on the right) of each optical waveguide pattern 5 are integrally communicated with the wide connection patterns 9 provided on both sides at the dimensional position "L", wherein "L" is a dimensional position which exceeds the effective range "l" necessary for each device in the process of manufacturing the optical waveguide device by cutting the wafer 7 into a predetermined chip after heat treatment. As shown in the drawing, in the first embodiment, the wide connection patterns 9 extend to the edge of the wafer 7.

In this embodiment, electric charges tend to accumulate in both narrow side portions 5a, 5b of the optical waveguide pattern 5, and both narrow side portions 5a, 5b are connected to the connection pattern 9 so that they are grounded. Accordingly, electric charges in the portions 5a and 5b are effectively released to the outside (the connection pattern 9), the area of which is larger. Further, individual metallic patterns (optical waveguide patterns) 5 are connected with each other at the wafer portion which are substantially unnecessary for individual chips (individual optical waveguide devices). Therefore, even in the case of electric discharge breakdown of both side portions 5a, 5b which are susceptible to electric discharge breakdown, the obtained product (optical waveguide device) is not affected by the electric discharge breakdown. For this reason, damage caused by electric discharge breakdown in the optical waveguide pattern 5 can be substantially extinguished or reduced.

Rectangular conductor regions 8 protruded inside from wide conductor patterns 9 on both sides function as a marker when a finished product (optical waveguide device) is cut off in the effective chip range l. At the same time, when rectangular conductor regions 8 induce electric discharge breakdown in a region except for the effective chip range, electric charges in the effective chip range can be discharged.

After the optical waveguide pattern shown in FIG. 1 has been formed, an electrode (not shown) for this optical waveguide is made, of metal such as gold (Au), on the optical waveguide pattern by means of well-known film forming technique.

Figure 2:
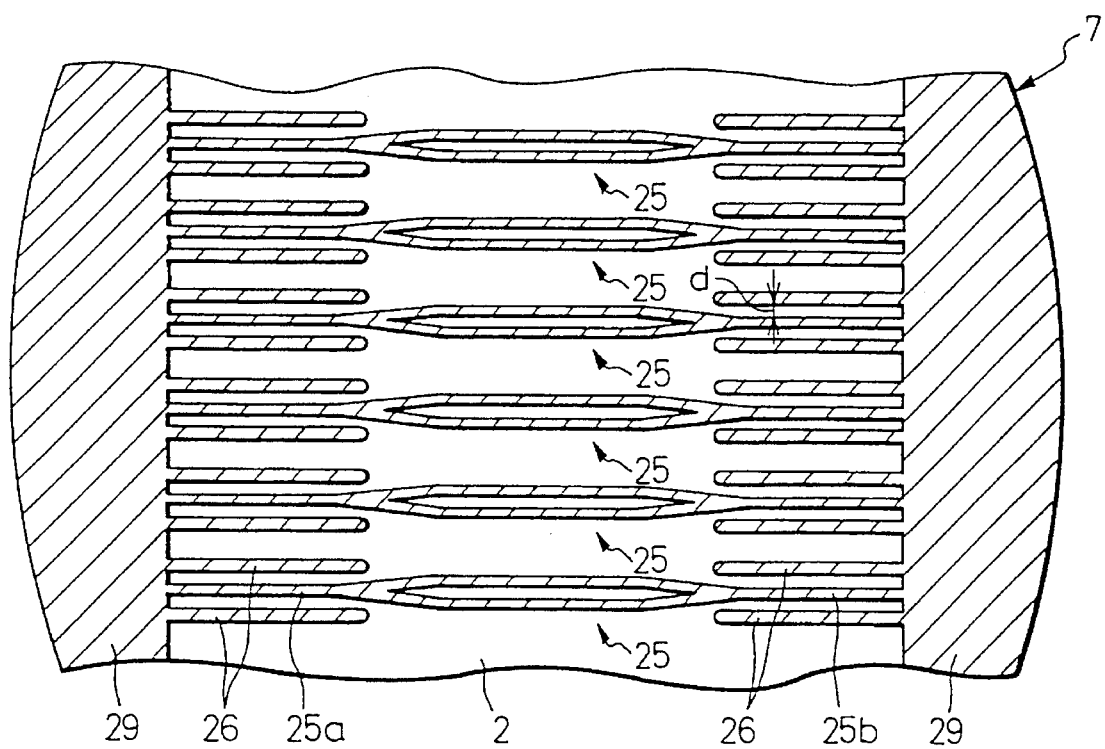
FIG. 2 is a plan view of the primary portion of the second embodiment.
Figure 3:
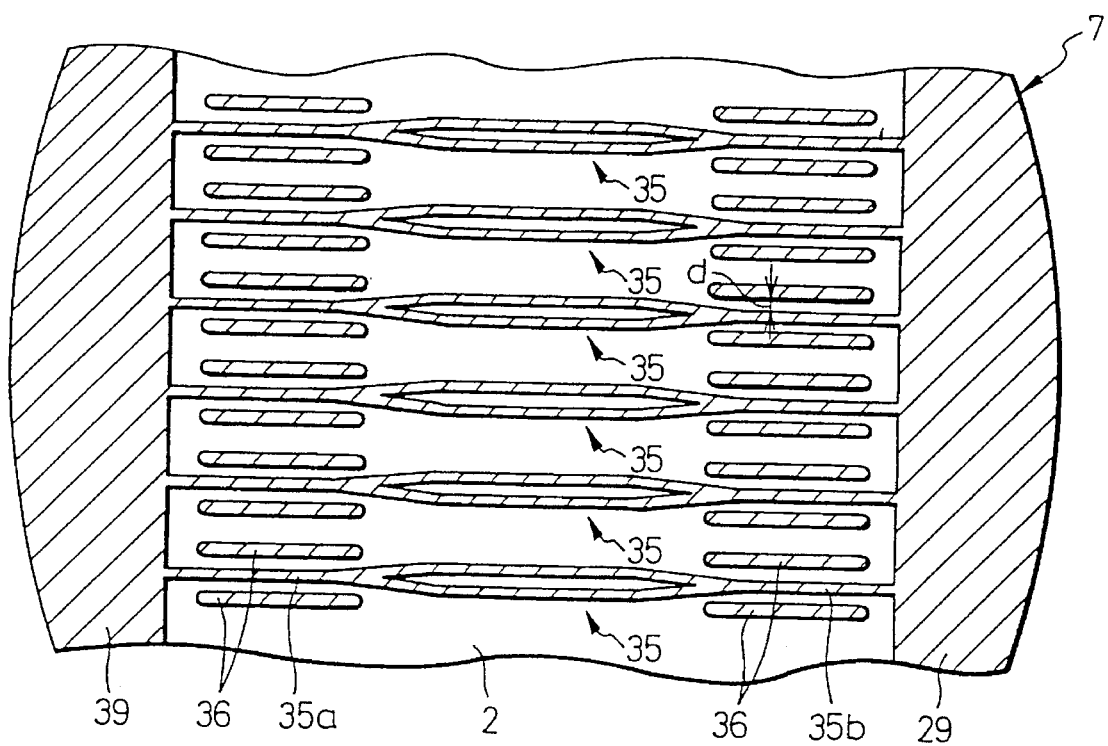
FIG. 3 is a plan view of the primary portion of the third embodiment.

Next, the second embodiment shown in FIG. 2 and the third embodiment shown in FIG. 3 will be explained as follows.

In both embodiments, dummy patterns 26, 36 are disposed in parallel above and below both side portions 25a, 25b, 35a, 35b of the optical waveguide patterns 25, 35. In the second embodiment, the dummy patterns 26 are integrally extended from the connection pattern 29, and in the third pattern, the dummy patterns 36 are independent long and thin islands.

In both embodiments, the dummy patterns 26, 36 are provided close to the optical waveguide patterns. Accordingly, the accumulated electric charges are dispersed over the patterns. Further, since the corners of both dummy patterns 26, 36 are rounded, electric charges are not concentrated at these corners. Accordingly, the optical waveguide patterns 25, 35 are less susceptible to electric discharge breakdown. In this connection, gaps "d" formed between the dummy patterns 26, 36 and both side portions 25a, 25b, 35a, 35b of the optical waveguide patterns 25, 35 are appropriately 60 to 80 µm.

Figure 4:
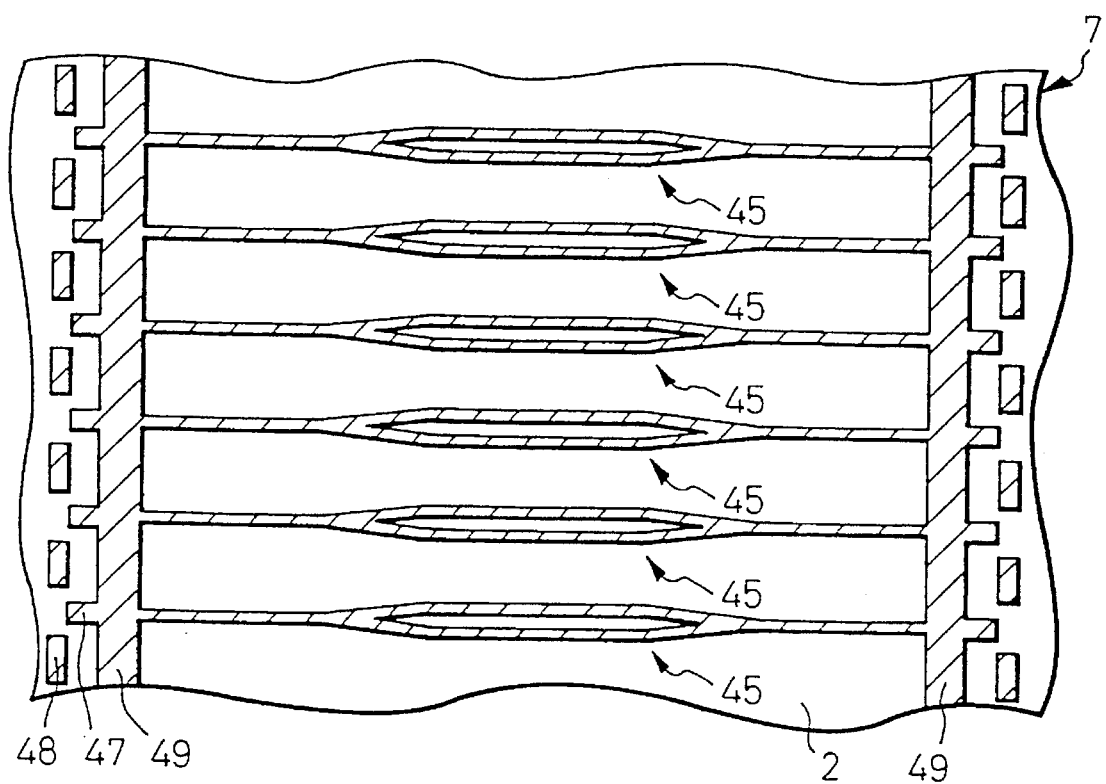
FIG. 4 is a plan view of the primary portion of the fourth embodiment.

Next, the fourth embodiment shown in FIG. 4 will be explained as follows.

Unlike the second and third embodiments described above, in this embodiment, dummy patterns are not provided close to the optical waveguide patterns. Instead of that, at positions which are located outside of the effective chip range of the first embodiment, for example, at positions outside of the connection patterns 49 on both sides, rectangular pattern portions 47 are protruded from the connection pattern 49, and a plurality of rectangular island-shaped dummy patterns 48 are provided close to these pattern portions 47. Therefore, unlike the first embodiment, in this embodiment, the connecting patterns 49 on both sides are not extended to the edges of the wafer 7, and the connecting patterns 49 are formed into a configuration having a predetermined width.

Since sharp corners are formed in the pattern portions 47 and island-shaped patterns 48, electric discharge tends to be induced. (These patterns 47, 48 will be referred to as an electric discharge inducing pattern, hereinafter.) Since the electric discharge inducing patterns 47, 48 exist on the substrate, electric charges on the optical waveguide patterns 45 located at the center are released to the electric discharge inducing patterns 47, 48, so that the amount of electric charge on the optical waveguide patterns 45 located at the center is reduced. As a result, the optical waveguide patterns 45 are less susceptible to electric discharge breakdown.

Figure 5:
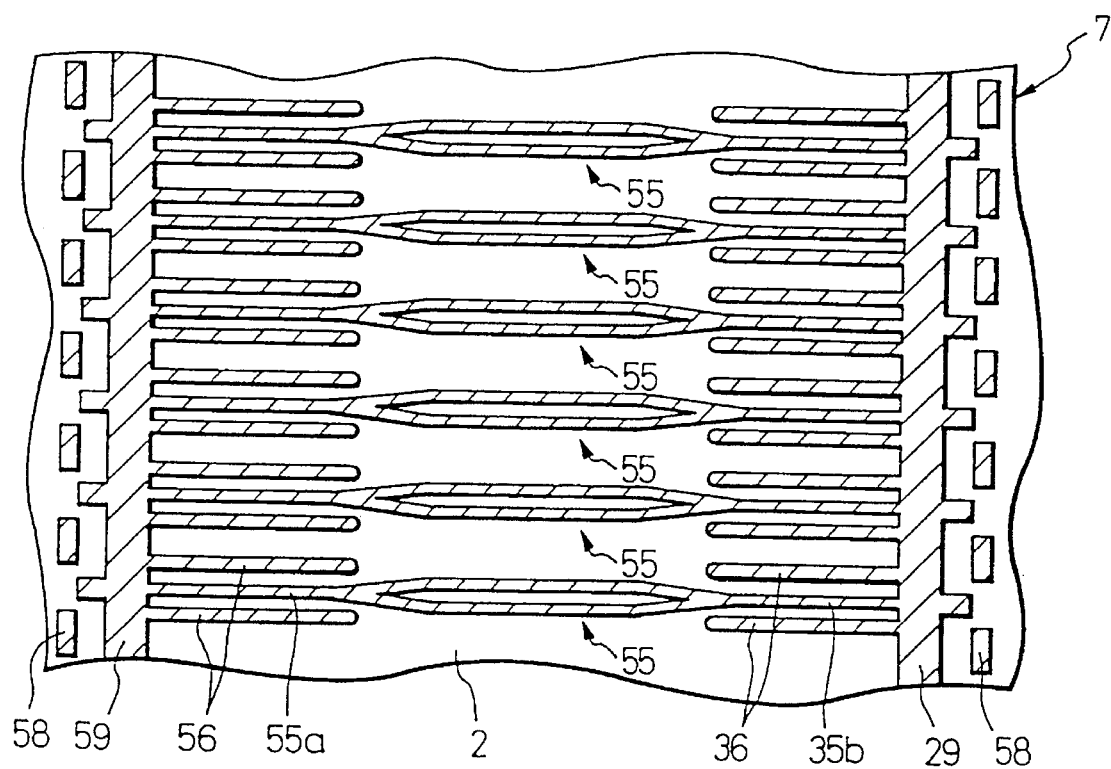
FIG. 5 is a plan view of the primary portion of the fifth embodiment.
Figure 6:
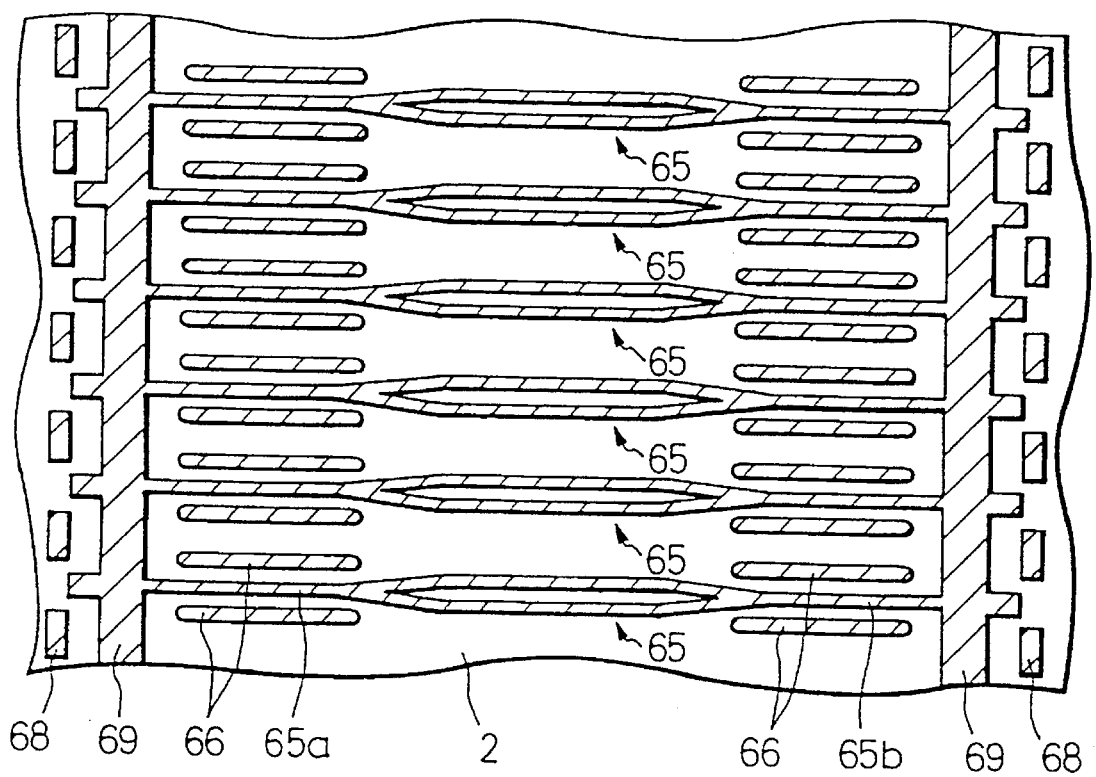
FIG. 6 is a plan view of the primary portion of the sixth embodiment.

Next, the fifth embodiment shown in FIG. 5 and the sixth embodiment shown in FIG. 6 will be explained as follows.

In both embodiments, in addition to the construction described in the fourth embodiment, dummy patterns 56, 65 are disposed in parallel above and below portions 55a, 55b, 56a, 56b on both sides the optical wavelength patterns 55, 65. In the fifth embodiment, the dummy patterns 56 are integrally extended from the connection patterns 59, which is similar to the second embodiment. In the sixth pattern, the dummy patterns 66 are independently formed into long and thin islands, which is similar to the third embodiment.

Since the patterns are compounded as described above, in each embodiment, the amount of accumulated electric charges in the portions 55a, 55b, 56a, 56b on both sides of the optical waveguide patterns 55, 65 is remarkably reduced. As a result, it is possible to reduce or eliminate the occurrence of electric discharge breakdown.

Figure 7:
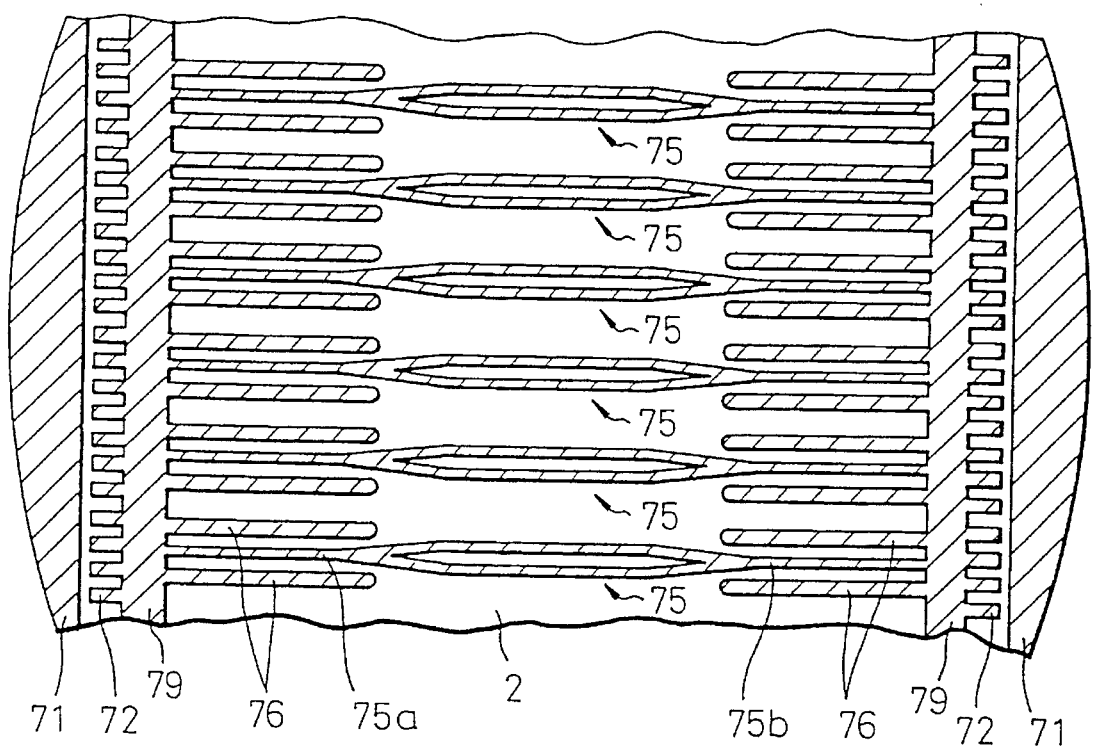
FIG. 7 is a plan view of the primary portion of the seventh embodiment.
Figure 8:
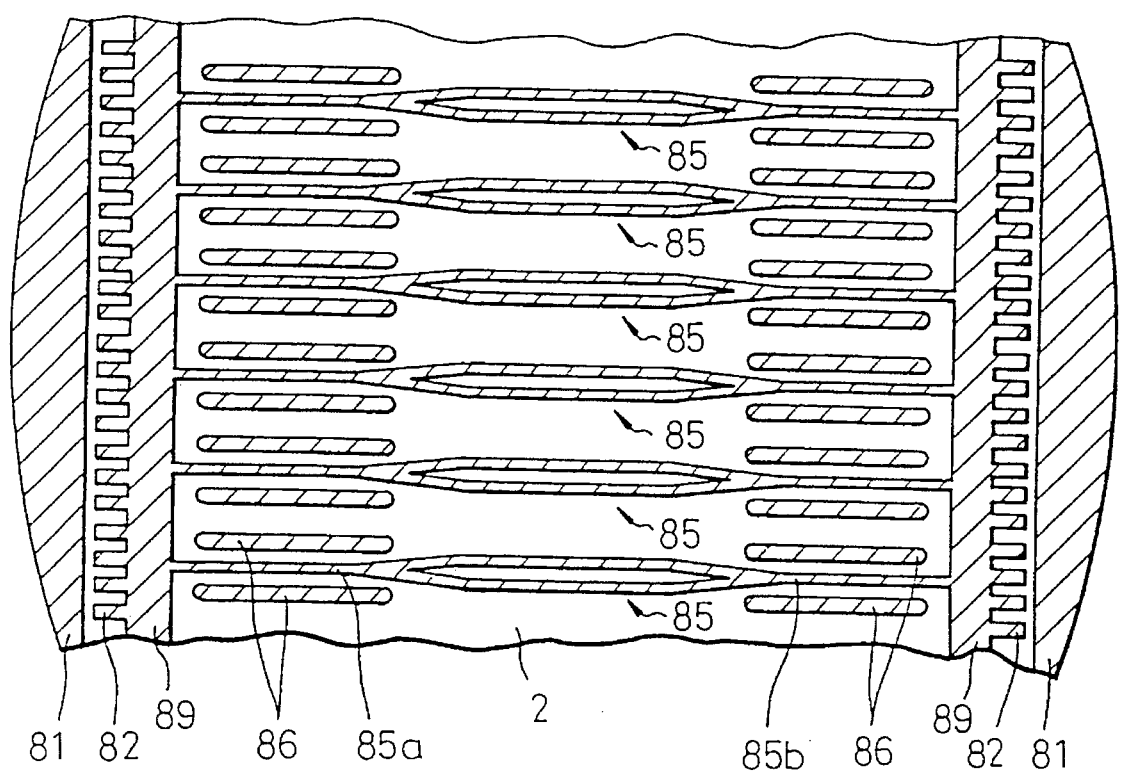
FIG. 8 is a plan view of the primary portion of the eighth embodiment.

Finally, the seventh embodiment shown in FIG. 7 and the eighth embodiment shown in FIG. 8 will be explained as follows.

In the same manner as the fifth (second) and sixth (third) embodiments, in dummy patterns 76, 86 are disposed in parallel above and below the portions 75a, 75b, 86a, 86b provided on both sides of the optical waveguide patterns 75, 85. That is, in the seventh embodiment, as in the fifth embodiment, the dummy patterns 76 are integrally extended from the connection patterns 79. In the eighth embodiment, as in the sixth embodiment, the dummy patterns 86 are independently formed into a long and thin islands.

Further, instead of the rectangular island-shaped dummy patterns 48, 58, 68 in the fourth to sixth embodiments, a large number of relatively thin rectangular pattern portions 72, 82 protruding from the connection patterns 79, 89 on both sides, are disposed at short intervals. Further, relatively wide conductor pattern portions 71, 81 extending to the edges of the wafer 7 are formed close to the ends of these pattern portions 72, 82.

Since the sharp patterns 72, 82 are disposed at short intervals close to the conductor patterns 71, 81, the areas of which are relatively large, electric discharge tends to be induced between the patterns 72, 82, or between the pattern 72 and the conductor pattern 71, or between the pattern 82 and the conductor pattern 81. Especially, electric discharge tends to be induced at the corners. These patterns function as an electric discharge inducing pattern, and exist outside of the effective chip range on the substrate. Accordingly, electric charges in the optical waveguide patterns 75, 85 located at the center of the wafer are discharged to the side of these electric discharge inducing patterns, so that the electric charges in the optical waveguide patterns 75, 85 at the center are reduced. As a result, the optical waveguide patterns 75, 85 are less susceptible to electric discharge breakdown.

Several preferred embodiments are described above, however, it should be noted that the present invention is not limited to the specific embodiment, and variations and modifications may be made within the scope of the appended claims without departing from the spirit of the present invention.

For example, in the above embodiment, it is illustrated in the drawing that the dummy patterns 26, 36, 46, 56, 66, 76, 86 are ended at the branch portions or joint portions of the optical waveguide patterns located at the center, however, the dummy patterns may be extended to positions closer to the center of the optical waveguide patterns. On the contrary, the dummy patterns may not extend to the effective chip range. In the above embodiment, both ends of the optical waveguide patterns are communicated with the connection patterns, however, when only one end is connected with the connection pattern, "a useful" effect can still be somewhat provided. Alternatively, a plurality of dummy patterns may be respectively provided on both sides of the optical waveguide patterns.

INDUSTRIAL APPLICABILITY

As explained above, according to the present invention, electric discharge breakdown of optical waveguide patterns can be substantially prevented or reduced. Therefore, the yield of the manufacturing process of optical waveguide devices can be greatly enhanced. It is also possible that the temperature gradient can be increased in the process of heat treatment (heating processing). Consequently, it is possible to reduce the manufacturing time (the time necessary for raising and lowering the temperature). Therefore, the present invention can be widely applied to optical waveguide devices.

We claim:

1. A manufacturing method for an optical waveguide device of length 1 comprising the steps:

forming a metallic conductor pattern on a substrate having a pyroelectric effect; said conductor pattern including an optical waveguide pattern located in an effective chip range of said substrate, said effective chip range being an area of said substrate having a width equal to 1;

heating the substrate to thermally diffuse the metallic conductor pattern; and cutting the substrate in said effective chip range to provide a chip-shaped optical waveguide device, said conductor pattern further including a conductor portion wider than the optical waveguide pattern located at a position outside of the effective chip range on the substrate, and at least one end of the optical waveguide pattern connects with the conductor portion.

2. The manufacturing method for an optical waveguide device according to claim 1, wherein a plurality of said optical waveguide patterns are disposed in parallel on said substrate.

3. The manufacturing method for an optical waveguide device according to claim 2, wherein said conductor portion is outside of the effective chip range on two sides of said substrate and ends of each optical waveguide pattern are respectively connected with the two sides of the conductor portion.

4. The manufacturing method for an optical waveguide device according to claim 1, wherein said metallic conductor pattern further defines a dummy pattern on said substrate at a position close to said optical waveguide pattern.

5. The manufacturing method for an optical waveguide device according to claim 4, wherein a configuration of said dummy pattern is approximately linear and a corner of said dummy pattern is rounded.

6. The manufacturing method for an optical waveguide device according to claim 4, wherein a configuration of said dummy pattern is approximately linear, and one end of said dummy pattern is connected with said conductor portion and another end is rounded.

7. A manufacturing method for an optical waveguide device of length 1, comprising the steps:

forming a metallic conductor pattern defining a plurality of optical waveguide patterns in parallel on a substrate having pyroelectric effect, said waveguide patterns being in an effective chip range of said substrate, said effective chip range being an area of said substrate having a width equal to 1;

heating the substrate to thermally diffuse the metallic conductor pattern; and cutting the substrate in said effective chip range to provide a plurality of chip-shaped optical waveguide devices, a connecting conductor portion being connected with an end of each optical waveguide pattern, said metallic conductor pattern further defining an electric discharge inducing portion protruding from the connecting conductor portion and located at a position on the substrate outside of the effective chip range.

8. The manufacturing method for an optical waveguide device according to claim 7, wherein said connecting conductor portion is outside of said effective chip range and located on two sides of said substrate, ends of each optical waveguide pattern being respectively connected with the two sides of the conductor connecting portion.

9. The manufacturing method for an optical waveguide device according to claim 7, wherein said metallic conductor pattern further defines a dummy pattern close to and in parallel with said optical waveguide patterns, said electric discharge inducing portion protruding from said connecting conductor portion to a side opposite to said waveguide pattern.

10. The manufacturing method for an optical waveguide device according to claim 7, wherein said metal conductor pattern further defines another conductor portion on said substrate at a position outside of said effective chip range and close to said electric discharge inducing portion.

11. The manufacturing method for an optical waveguide device according to claim 7, wherein said electric discharge inducing portion includes a sharp corner.

12. The manufacturing method for an optical waveguide device according to claim 7, wherein said metallic conductor pattern further defines a plurality of island-shaped conductor portions on said substrate at positions outside of said effective chip range and close to said electric discharge inducing portion.

13. A manufacturing method for an optical waveguide device of length 1 comprising the steps of:

forming a metallic conductor pattern on a substrate having pyroelectric effect;

said conductor pattern defining an optical waveguide pattern located in an effective chip range of said substrate, said effective chip range being an area of said substrate having a width equal to 1;

heating the substrate for thermally diffusing the metallic conductor pattern; and cutting the substrate in said effective chip range to provide a chip-shaped optical waveguide device, said metallic conductor pattern further defining a dummy pattern that is shorter than the conductor pattern for the optical waveguide at a position close to said optical waveguide pattern on said substrate.

14. The manufacturing method for an optical waveguide device according to claim 13, wherein said metallic conductor pattern further defines a plurality of optical waveguide patterns disposed in parallel on said substrate, each end of the plurality of optical waveguide patterns connects with a connecting conductor portion defined by said metallic conductor pattern at a position out of said effective chip range on said substrate, and one end of said dummy pattern connects with said connecting conductor portion.

15. The manufacturing method for an optical waveguide device according to claim 14, wherein an other end of said dummy pattern is rounded.

* * * * *